United States Patent Office 3,346,413
Patented Oct. 10, 1967

3,346,413
METHOD AND APPARATUS FOR COATING
WIRE AND SOLVENT RECOVERY
Otto H. Lindemann, Buffalo, N.Y., assignor to Hooker
Chemical Corporation, Niagara Falls, N.Y., a corporation of New York
Filed Oct. 12, 1964, Ser. No. 403,202
8 Claims. (Cl. 117—102)

ABSTRACT OF THE DISCLOSURE

A process and apparatus for coating wire wherein the wire to be coated is passed through a body of hot liquid coating composition which contains a substantially non-flammable halogenated hydrocarbon solvent, heated coating compositions being continuously added to and removed from the coating composition bath as the wire is passed therethrough. The wire is passed from the coating bath through a die maintained in a zone of solvent vapor, excess coating composition being removed from the wire as it passes through the die. The thus-coated wire is then passed through a cooling zone wherein solvent which has volatilized from the coating composition and from the coated wire is condensed and recovered and, thereafter, the wire is then further heated, at a temperature above the boiling point of the solvent but below that at which substantial curing of the coating takes place, to remove substantially all remaining solvents from the coating. The apparatus for carrying out this process includes a suitable coating solution tank which is formed into a coating section and a sump section by a weir positioned in the tank. Means are provided for introducing coating solution into the tank so that a substantially continuous circulation of coating solution through the coating tank, and over the weir and into the sump portion of the tank is provided. A cooling zone is positioned above the coating tank and adjacent thereto so as to form a solvent vapor zone above the surface of the coating solution in the tank. A suitable die member is positioned in the area of the vapor zone which is formed and a heating section is positioned above and adjacent to the cooling section. Means are provided for introducing the wire to be coated into the coating solution tank so that it passes upwardly therethrough, through the coating section chamber of the tank, the die member, the cooling section and the heating section of the apparatus.

---

Figure 1:
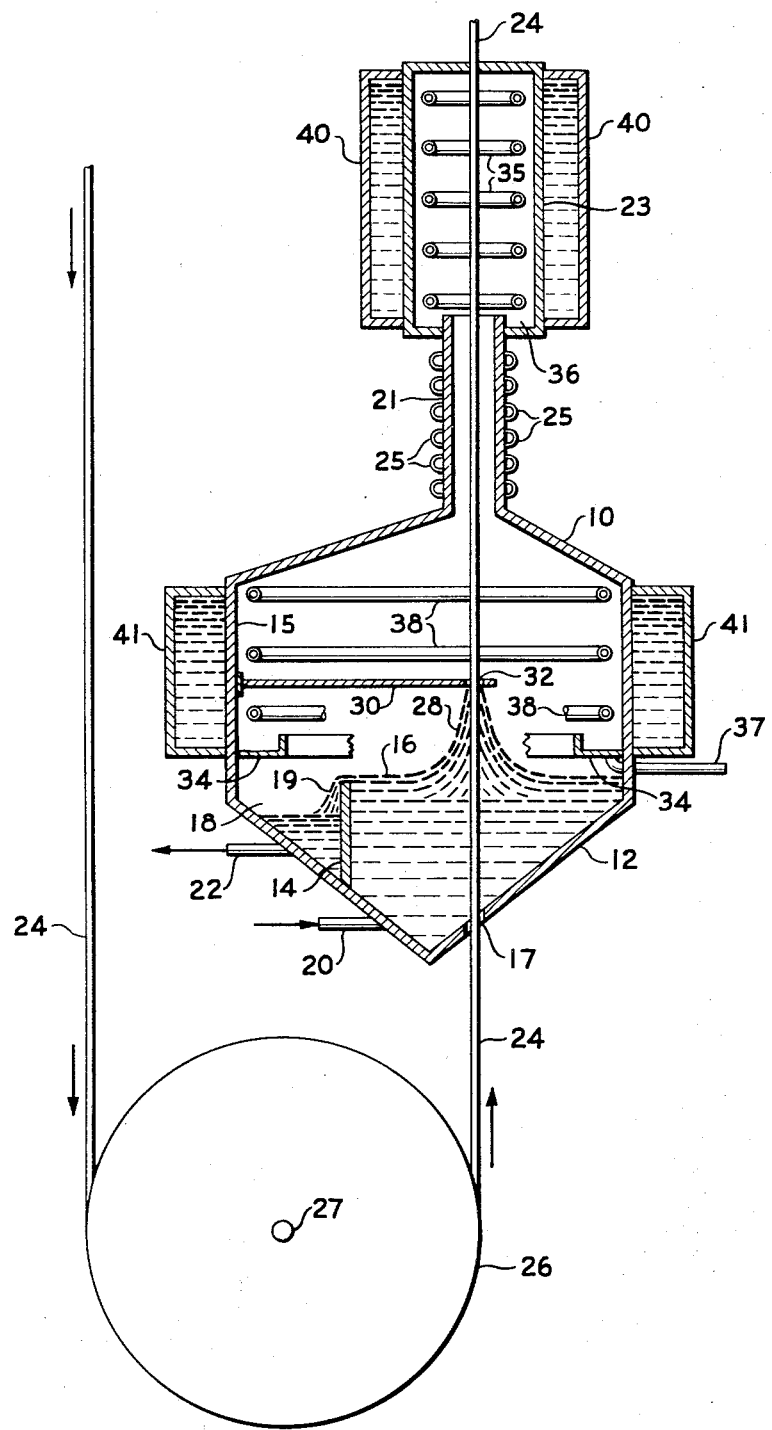

This application is a continuation-in-part of S.N. 300,320 filed Aug. 6, 1963. This invention relates to an apparatus and a method for coating elongated articles such as wire and a solvent recovery system for volatile solvents used with the coating composition.

In the application of coating compositions to wire and the like elongated articles, the normal practice is to apply a coating composition in a substantially diluted condition. The coating composition often contains more than 50 percent solvent which is volatlized during the coating and curing steps. In large commercial operations, the quantity of a solvent expended in this operation is considerable. Previously, no practical and economical method was known to recover the solvent for reuse, and therefore the solvent was allowed to escape from the curing ovens or to be decomposed prior to venting to the atmosphere. The present invention provides an apparatus and a process which eliminates the expensive waste of solvent and effects a more economical process for wiring coating.

It is an object of the present invention to provide a novel apparatus and a process by which hot coating compositions are applied to wire and the like elongated articles using a substantially non-flammable, volatile solvent for the coating composition.

Another object of this invention is to provide an apparatus and means for recovering solvent volatilized from hot coating compositions and coated wire during coating operations.

A further object of this invention is to provide a novel apparatus which aids in the volatilization of the solvent and subsequently recovers the evolved solvent.

These and other objects will become apparent to those skilled in the art from the description of the invention.

In accordance with the present invention, a process for coating wire and the like elongated articles is provided comprising passing wire to be coated through a coating composition comprising a substantially non-flammable halogenated hydrocarbon solvent, maintaining a cooled zone above the hot coating composition, passing the coated wire through the cooled zone, condensing solvent volatilized from the coating composition and the withdrawn wire in the cooled zone, and heating the applied coating to effect the removal of substantially all of the solvent.

The present invention provides numerous improvements over previously known wire coating methods. The use of a substantially non-flammable organic solvent and the method of recovering large quantities of such solvents for reuse with the coating composition, provides greatly increased economical operation. In addition, the recovery of solvent reduces contamination of the atmosphere and waste disposal problems. Also, the hot coating compositions used with the present invention substantially eliminate danger or fire and explosion, ends not attainable with conventional organic solvents. The safety factors obtained in low air pollution and the resulting reduction in the hazards of toxicity, in addition to other recited safety advantages obtained by the present invention, have not previously been realized in wire coating operations.

Figure 2:
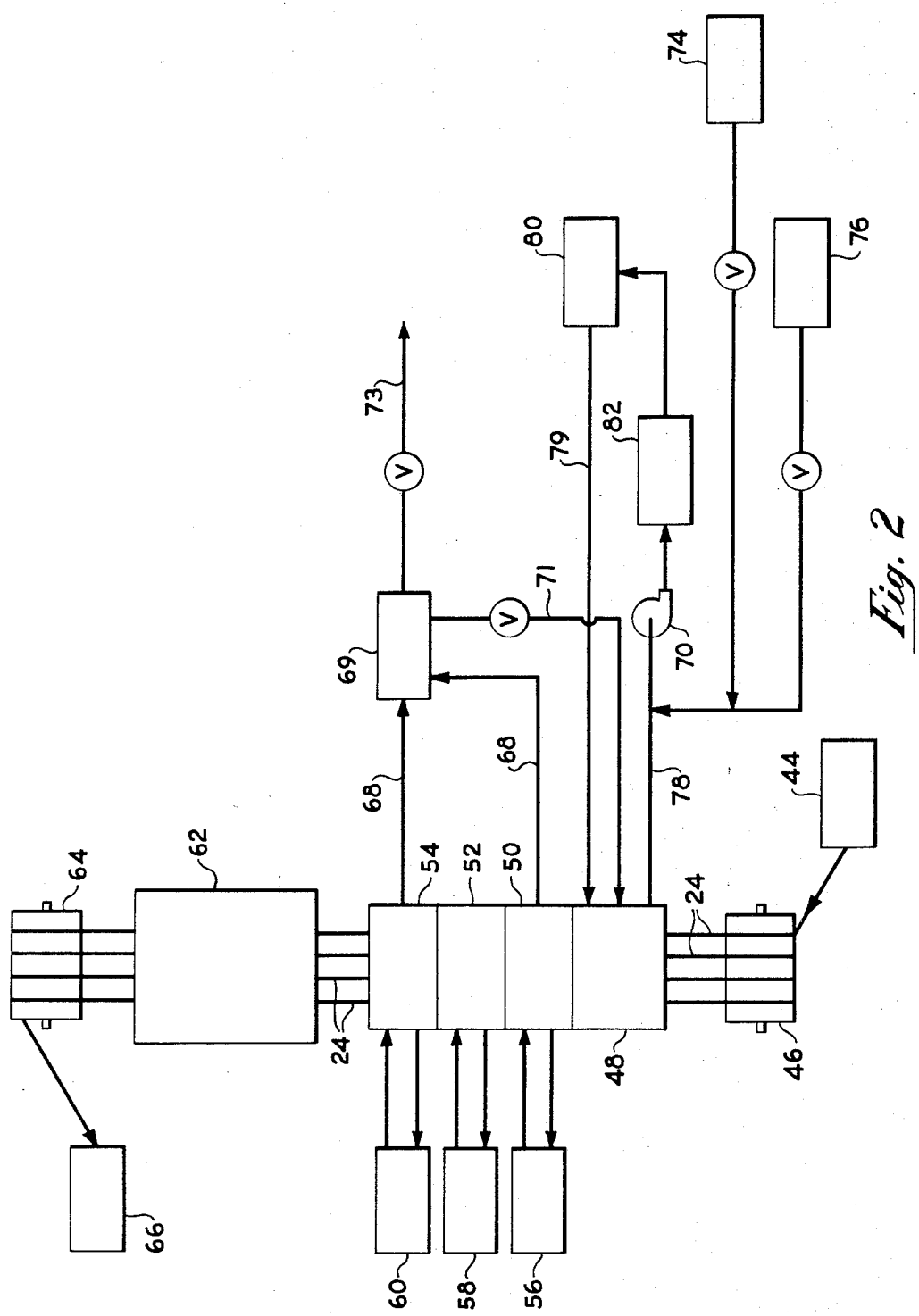

The method and apparatus of this invention will be further described with reference to the drawings in which:

FIG. 1 is a vertical sectional view of the apparatus of the present invention; and FIG. 2 is a partial schematic and flow sheet of the process and apparatus of the present invention.

Referring to FIG. 1, the apparatus of this invention comprises a coating unit 10 including a coating tank 12 and a solvent recovery section 15. Optionally, an additional solvent recovery section composed of a heating zone 21 and condensing zone 23 can be used to effect additional solvent recovery.

The coating tank 12 is a container having one or more openings 17 in the bottom thereof through which wire 24 or other elongated materials can be drawn. Inlet 20 is provided in coating tank 12, for the replenishment of liquid coating composition. Weir 14 is provided for the purpose of maintaining a constant level in coating tank 12 while continuously circulating liquid coating composition. Liquid coating composition is continually or intermittently fed into inlet 20, the excess flows over weir 14, thus maintaining a relatively constant overflow 19 into sump 18. The coating composition in sump 18 is continually removed through outlet 22 and subsequently recycled to coating tank 12.

Obviously, the coating composition in tank 12 will change in composition over a period of time due to solvent evaporation. It is therefore preferred to circulate the coating composition continuously during operation of the apparatus. The proportions of the ingredients in the coating composition may thus be maintained constant, new ingredients being added as required. It will be seen that a relatively small volume of coating compositions can be used, resulting in the complete renewal of the coating tank contents at frequent intervals as coating composition is used and circulated.

Wire 24 is continually drawn through opening 17 and coating tank 12, forming a column 28 as it is pulled through the coating compostion surface 16. The withdrawn wire 24 passes through die 32 held by die holder 30 which is attached to the wall of the solvent recovery section 15. Die 32 can be positioned above, below or within solvent recovery section 15. Die 32 removes excess coating composition over and above a pre-determined thickness. Wire 24 continues through the solvent recovery section 15 and through heating zone 21 and condensing zone 23, if the latter two zones are included, prior to entering a curing zone. Wire passing out of the curing zone may be subsequently returned to the coating unit 10 for additional coatings, thereby providing the wire with a plurality of indiivdually applied and cured coatings.

Drum 26 rotating on axle 27 provides a guide for both uncoated wire and wire returning from a curing zone, so that proper alignment through coating tank 12 and die 32 is obtained. Therefore, drum 26 normally guides one or more wires 24 through coating unit 10.

Positioned immediately above coating tank 12 are cooling coils 38 which provide a cooled zone for the solvent recovery section 15. Positioned below cooling coils 38 is trough 34 which collects solvent condensed on cooling coils 38 and the walls of solvent recovery section 15. The solvent collected in trough 34 is removed via solvent outlet 37 and recovered for further use. Surrounding the exterior of solvent recovery section 15 is a temperature control jacket 41 through which additional cooling fluid is passed to provide additional chilling to the solvent recovery section 15.

The size of solvent recovery section 15 can be varied as well as the number of cooling coils 38 contained therein to meet the requirements of the particular wire being coated and the speed of operation. As the speed of passing the wire through the solvent recovery section 15 increases, the vapor zone tends to rise, too. This indicates the desirability of additional height being provided in solvent recovery section. Also, heavier gage wire retains more sensible heat which affects the size of the solvent recovery section 15. Therefore, the size of solvent recovery section 15 is that which is necessary to retain the volatilized solvent. This is readily determined empirically.

When small gage wire is being coated and the sensible heat retained therein is insufficient to volatilize all of the solvent on being withdrawn from the coating tank 12, it is often desirable to add heating zone 21 and condensing zone 23. Heating zone 21 is a narrow passage through which wire 24 is drawn into close proximity with the heat source. Heat is supplied to heating coils 25 which surround the heating zone. Sufficient heat is supplied to substantially volatilize residual solvent on the newly coate wire but such heat is insufficient to effect a cure of the coating composition. Therefore, the temperature in heating zone 21 does not greatly exceed the boiling point of the solvent and normally ranges from the solvent boiling temperature to about 50-100 degrees centigrade above the boiling point.

Solvent volatilized in heating zone 21 is condensed in condensing zone 23. Condensing zone 23 has cooling coils 35 and solvent trough 36 to condense and collect solvent on the interior, and temperature control jacket 40 surrounding the exterior thereof. Solvent condensed is again recovered for reuse.

It is seen that the present apparatus treats wire by first applying a hot coating using volatile solvents and subsequently passes the hot coated wire through a cooled zone to recover the solvent, or alternately, the apparatus applies a hot coating to the wire, passes the wire through a cooled zone for solvent recovery, a heated zone to volatilize additional solvent and finally an additional cooled zone to recover the latter volatilized solvent.

FIG. 2 illustrates the overall process of the present invention wherein uncoated wire 44 is fed to drum 46 which aligns the wire for a pass through coating area 48. Wire 24 is passed through coating area 48 and subsequently through condensing area 50 through which cooling liquid 56 is circulated. Wire 24 continues into heat exchange area 52, through which is circulated heat exchanger liquid 58. Heat exchanger liquid 58 provides either additional cooling or heating by means of liquids or steam to heat exchanger zone 52. When heating is supplied, solvent is released from the coated wire. Wire 24 then passes to condensing zone 54 through which is circulated cooling liquid 60. Condensing zone 54 is a chilled area in which solvent released in heat exchanger zone 52 is condensed and recovered.

It is readily seen that condensing zone 50, heat exchanger zone 52, and condensing zone 54, may all provide a cooled area for the condensing of volatilized solvents.

From condensing zone 54 wire 24 passes into curing chamber 62, which normally is an oven and effects a thermal conversion of the coating composition to a less soluble state. Wire passing through curing chamber 62 rotates about drum 64 and is thereby returned to drum 46 for additional passes through coating area 48. Eventually, after one or a plurality of passes through the coating area 48 and the solvent recovery and curing areas, the coated wire is removed and collected at area 66.

Coating area 48 is continuously replenished with hot coating composition in solution with a halogenated hydrocarbon solvent. Solvent condensed in the condensing zones 50 and 54 is recovered and returned or removed via solvent recovery lines 68 to water separator 69. From water separator 69, part of the solvent is returned via line 71 to the sump of coating area 48 thereby maintaining a balanced liquid flow. The remainder of the solvent is removed via line 73 which may replenish solvent supply 76. Overflow coating composition from coating area 48 is returned via line 78 through pump 70 to filter 82. The properly formulated coating composition from coating composition supply 74 and solvent supply 76 is also passed through filter 82. From filter 82, the liquid mixture is passed through heat exchanger 80 wherein it is heated to the desired temperature prior to being returned to coating area 48 via line 79.

The apparatus of this invention and wire coating process described herein are designed for efficient operation with a process that involves the use of hot, liquid coating compositions which comprise film forming ingredients and, as a solvent for at least a major proportion of said ingredients, a relatively heavy, low-boiling, substantially non-flammable, halogenated hydrocarbon solvent such as trichloroethylene, perchloroethylene, the trichloroethanes and tetrachloroethanes, methylene chloride, ethylene dichloride, ethylidene chloride, the dichlorotetrafluoroethanes, the trichlorotrifluoroethanes, the trichlorodifluoroethanes, the tetrachlorodifluoroethanes, the fluorotrichloroethanes, the fluorotetrachloroethanes, methyltrichloroethylene, 1,2-dichloropropane, 1,2-dichloropropene, 1,1,2-trichloropropane, ethyltrichloroethylene and mixtures thereof, as well as other halogenated compounds similar in properties to those recited above.

As will be noted, these materials are often of about 1 to 4 carbon atoms and about 1 to 6 halogen atoms. Of these, the preferred material is trichloroethylene, used at a temperature not greatly lower than its boiling point of about 88 degrees centigrade.

The temperature of the coating composition is maintained at a temperature up to about 146 degrees centigrade. When using the preferred solvent, trichloroethylene, the preferred temperature range is 65 degrees centigrade to 88 degrees centigrade. The preferred temperature range for halogenated hydrocarbon solvents described is that just below the boiling point, e.g., 88 degrees centigrade for trichloroethylene, and 121 degrees centigrade for perchloroethylene or, about 2 to about 25 degrees centigrade below the boiling point of the solvent.

Various materials may be employed as coating compositions in the apparatus of this invention. Suitable compositions, either with or without pigment are well known and many are commercially available. Accordingly, there is no need for specifically setting forth herein the formula of any particular composition. Suffice it to say that alkyd resins, phenolic resins, epoxy resins, polyurethane resins, polyvinylformal resins and the like are examples of useful coating compositions. Because a small quantity of coating composition is used in the hot coating tank, even resins of poor thermal stability can be used.

The coating composition preferably has a viscosity at the coating temperature such that sufficient coating composition is retained on the wire, as withdrawn from the coating tank, to require removal of the excess by means of the dies. The viscosity is preferably maintained below that at which the merging of adjacent liquid columns of parallel wires would occur. The viscosity, therefore, may range from about 1000 to 7000 centipoises at the operating temperature. The preferred viscosity is from about 3000 to 5000 centipoises at the operating temperature. The preferred viscosity is readily determined and adjusted accordingly during the coating operation. The determination of the preferred viscosity will depend on the speed of the wire, which can vary between about 10 and 100 feet per minute, higher speeds and lower viscosities matching.

Important in achieving the highly efficient operation of the apparatus of the present invention is the building up of a coating layer of desired thickness by successive passages of wire through the same coating area. Also, the use of a coating area of relatively small volume permits the use of resins of lower thermal stability due to the high turn-over rate, and the use of condensation means for the volatilized solvent effects a highly efficient operation.

Quick build up of a sufficient coating permits economy of space as well as of equipment, since a plurality of coating tanks is not necessary and the single tank used need be only slightly larger than that required to space the wires one to several inches apart. The solvent recovery means are positioned in the coating section of the apparatus so as to form a relatively small vapor zone immediately above the heated coating composition and additional condensing area to condense solvent volatilized from the coated wire. The solvent condensation zone effects the removal of substantial amounts of solvent and, in many instances, nearly all solvent is removed and collected for reuse. This solvent removal, prior to entering the curing chamber, produces a coating on the wire which is smoother and less porous than that normally obtained by conventional means. Substantially all the solvent is removed prior to entering the curing chamber and thus a sudden volatilization of solvent is not effected. This reduces bubbling and porosity of the film.

It will be appreciated that although the present apparatus and process have been described in their most preferred embodiment, changes therein are possible and contemplated within the scope of this disclosure. Also, it will be understood that there are other possible variations in the process and apparatus herein disclosed so that numerous modifications in the apparatus shown may be made without departing from the spirit of the present invention. For example, the size and proportions of the apparatus, including the number of wires passing therethrough, may be varied as desired and so may be the shapes and arrangements of various components. Moreover, the apparatus and process of the present invention may be used with substantially non-flammable solvents other than halogenated hydrocarbons. Accordingly, it is to be understood that it is intended that each element recited in any of the following claims refers to all equivalent elements for accomplishing substantially the same results in substantially the same or equivalent manner, it being intended to cover the invention broadly in whatever form its principles may be utilized.

What is claimed is:

1. A process for coating wire which comprises forming a body of hot liquid coating composition, which composition contains as a solvent therefor, a substantially non-flammable halogenated hydrocarbon solvent, passing wire to be coated through said body of coating composition, continuously adding heated coating composition to and removing coating composition from said body while passing said wire therethrough, maintaining a cool zone immediately above the body of the coating composition, forming a zone of halogenated hydrocarbon solvent vapor above the body of coating composition, which zone is within and below said cooled zone, passing the wire from the body of coating composition through a die maintained within the zone of solvent vapor, removing excess coating composition from the wire, condensing and recovering solvent volatilized from the body of the coating composition and the thus-coated wire in said cool zone, removing the coating wire from said cooled zone, and, thereafter, heating the thus-coated wire to effect removal of substantially all solvent remaining in the coating, said heating being carried out at a temperature above the boiling point of the solvent but below that at which substantial curing of the coating takes place.

2. The process as claimed in claim 1 wherein after heating, the coated wire is passed through a second cooled zone wherein the solvent volatilized during the heating is condensed and recovered.

3. The process as claimed in claim 2 wherein after passing through the second cooling zone, the solvent-free coated wire is heat cured.

4. The process as claimed in claim 2 wherein the heating of the coated wire to volatilize the remaining solvent therein is carried out at a temperature within the range of the boiling point of the solvent to 100 degrees centigrade above said boiling point.

5. The process as claimed in claim 4 wherein the coating composition is maintained at a temperature which is from 2 to 25 degrees centigrade below the boiling point of the solvent.

6. A wire coating apparatus which comprises a coating solution tank, a weir member in said tank, positioned so as to divide the tank into a coating chamber and a sump chamber, means for introducing hot coating solution into said coating chamber, means for removing coating solution from said sump chamber, said solution introducing and removing means being positioned so as to effect substantially continuous circulation of coating solution within the coating chamber and further to effect the flow of coating solution from the coating chamber over the weir into the sump chamber, a first cooling section positioned above and immediately adjacent to said solution tank so as to form a solvent vapor zone immediately above the surface of the coating solution in said tank, said cooling section having means for condensing and recovering solvent, a die member adjacent said cooling section and positioned within the solvent vapor zone formed by said section, a heating section positioned above and adjacent said cooling section, the heating section having means therein to effect additional solvent volatilization, and means in the coating solution tank for introducing a wire to be coated, said means being in the bottom portion of said tank and positioned so that wire introduced therethrough passes upwardly through the coating solution in the coating chamber portion of said tank, through the die member, cooling section and heating section of said apparatus.

7. The apparatus as claimed in claim 6 wherein a second cooling section is provided positioned above and adjacent to the said heating section, said second cooling section having means therein for condensing and recovering solvent.

8. The apparatus as claimed in claim 7 wherein both the first and second cooling sections are comprised of cooling coils, a solvent collecting trough positioned below the cooling coils and a cooling jacket surrounding the cooling coils.

References Cited

UNITED STATES PATENTS

| | | | |
|---|---|---|---|
| 2,299,689 | 10/1942 | Fruth | 117—115 X |
| 2,345,390 | 3/1944 | Flynn | 117—102 X |
| 2,407,337 | 9/1946 | Kolter | 118—125 |
| 2,515,489 | 7/1950 | Borushko | 117—102 |
| 2,547,047 | 4/1951 | Saums et al. | 118—420 X |
| 2,861,897 | 11/1958 | Hendrixson | 117—102 X |
| 2,868,159 | 1/1959 | Lit et al. | 117—102 X |
| 2,896,640 | 7/1959 | Randall et al. | 134—105 X |
| 3,073,721 | 1/1963 | Pokorny | 117—102 X |

ALFRED L. LEAVITT, *Primary Examiner.*

J. R. BATTEN, JR., *Assistant Examiner.*